(12) United States Patent
Zhou et al.

(10) Patent No.: US 10,866,091 B2
(45) Date of Patent: *Dec. 15, 2020

(54) CONCENTRICITY DETECTION SYSTEM

(71) Applicants: Tyco Electronics (Shanghai) Co. Ltd., Shanghai (CN); TE Connectivity Corporation, Berwyn, PA (US)

(72) Inventors: Lei Zhou, Shanghai (CN); Dandan Zhang, Shanghai (CN); Roberto Francisco-Yi Lu, Bellevue, WA (US)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,823

(22) Filed: Aug. 29, 2019

(65) Prior Publication Data

US 2020/0072602 A1      Mar. 5, 2020

(30) Foreign Application Priority Data

Aug. 29, 2018    (CN) .................... 2018 2 1404361 U

(51) Int. Cl.
*G01B 11/27* (2006.01)
*G01B 5/252* (2006.01)

(52) U.S. Cl.
CPC ............ *G01B 11/272* (2013.01); *G01B 5/252* (2013.01)

(58) Field of Classification Search
CPC ... G01B 11/272; G01B 11/022; G01B 11/024; G01B 11/028; G01B 11/03; G01B 11/08; G01B 11/12; G01B 11/14; G01B 11/24; G01B 11/2408; G01B 11/2518; G01B 11/255; G01B 11/27; G01B 11/30; G01B 11/303; G01B 11/306; G01B 2210/40; G01B 2210/42; G01B 2210/46; G01B 11/26–272; G01B 5/252; G01B 5/0004; G01B 11/06; G02F 1/133602; G01N 21/01; G01N 21/03; G01N 21/90;
(Continued)

(56) References Cited

U.S. PATENT DOCUMENTS 2,433,558 A * 12/1947 Hurley, Jr. ......... G01B 11/2408
356/394
4,221,961 A * 9/1980 Peyton ............... G01N 21/9018
250/223 B
(Continued)

*Primary Examiner* — Christina A Riddle
(74) *Attorney, Agent, or Firm* — Barley Snyder

(57) ABSTRACT

A concentricity detection system is adapted to detect a concentricity of an annular component. The concentricity detection system includes a support base having a recess on a top surface, a transparent plate received and positioned in the recess, a vision detection device located above the support base and facing the transparent plate, and a backlight source located below the support base and facing the transparent plate. The annular component is disposed in the recess of the support base and supported on a top surface of the transparent plate. The vision detection device is configured to detect the concentricity of the annular component supported on the transparent plate. A through hole is formed in a bottom portion of the recess and a light from the backlight source passes through the support base via the through hole and the transparent plate to provide backlighting for the annular component.

15 Claims, 2 Drawing Sheets

(58) Field of Classification Search
CPC ........... G01N 21/9072; G01N 21/9081; G01N 21/84; G01N 21/88; G01N 2021/0106; G01N 2021/0112; G01N 2021/0118; G01N 2021/0137; G01N 2021/0143; G01N 2021/015; G01N 2021/0156; G01N 2021/0162; G02B 6/3843; G02B 6/385; G02B 6/422; G02B 6/4221; G02B 6/4222; G02B 6/4224; G02B 6/4225; G02B 6/4226; G02B 6/4227; G02B 6/4233; G02B 6/4234; G01C 15/002; G01C 15/004; G06T 7/50
USPC ..... 356/614–640, 399–401, 138–155, 237.1, 356/239.1–241.6, 237.6, 244, 246, 256
See application file for complete search history.

(56) References Cited

U.S. PATENT DOCUMENTS

| | | | | |
|---|---|---|---|---|
| 4,634,273 A * | 1/1987 | Farleman | ............... | G01B 11/08 356/237.1 |
| 4,819,167 A * | 4/1989 | Cheng | ............... | H01L 21/681 250/442.11 |
| 5,466,927 A * | 11/1995 | Kohler | ............... | G01N 21/9045 250/223 B |
| 6,246,921 B1 * | 6/2001 | Kim | ............... | G01B 11/272 700/159 |
| 6,816,609 B1 * | 11/2004 | Shimizu | ............... | G01B 11/024 348/86 |
| 9,329,024 B2 * | 5/2016 | Kawa | ............... | G01B 11/028 |
| 2017/0324895 A1 * | 11/2017 | Bryll | ............... | H04N 5/2353 |

\* cited by examiner

CONCENTRICITY DETECTION SYSTEM

CROSS-REFERENCE TO RELATED APPLICATION

This application claims the benefit of the filing date under 35 U.S.C. § 119(a)-(d) of Chinese Patent Application No. 201821404361.2, filed on Aug. 29, 2018.

FIELD OF THE INVENTION

The present invention relates to a concentricity detection system and, more particularly, to a concentricity detection system adapted to detect a concentricity of a ring component.

BACKGROUND

A concentricity of a ring component is typically detected manually. However, the efficiency and accuracy of manual detection are very low.

SUMMARY

A concentricity detection system is adapted to detect a concentricity of an annular component. The concentricity detection system includes a support base having a recess on a top surface, a transparent plate received and positioned in the recess, a vision detection device located above the support base and facing the transparent plate, and a backlight source located below the support base and facing the transparent plate. The annular component is disposed in the recess of the support base and supported on a top surface of the transparent plate. The vision detection device is configured to detect the concentricity of the annular component supported on the transparent plate. A through hole is formed in a bottom portion of the recess and a light from the backlight source passes through the support base via the through hole and the transparent plate to provide backlighting for the annular component.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
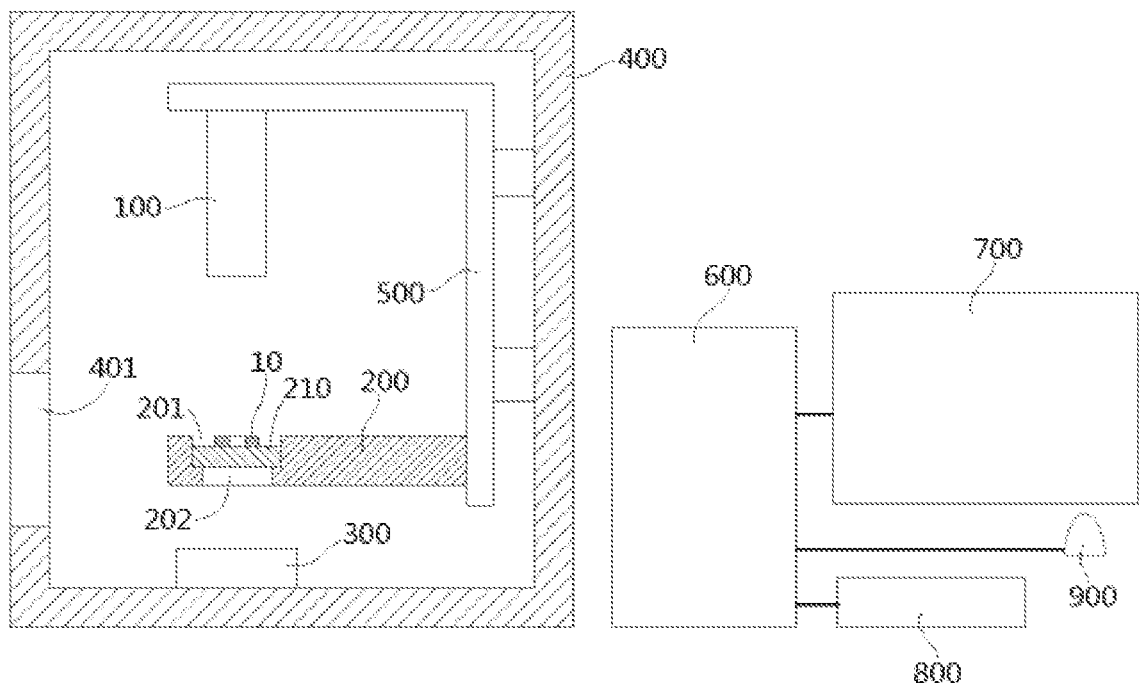
FIG. 1 is a perspective view of a concentricity detection system according to an embodiment.

The technical solution of the disclosure will be described hereinafter in further detail with reference to the following embodiments, taken in conjunction with the accompanying drawings. In the specification, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

Figure 2:
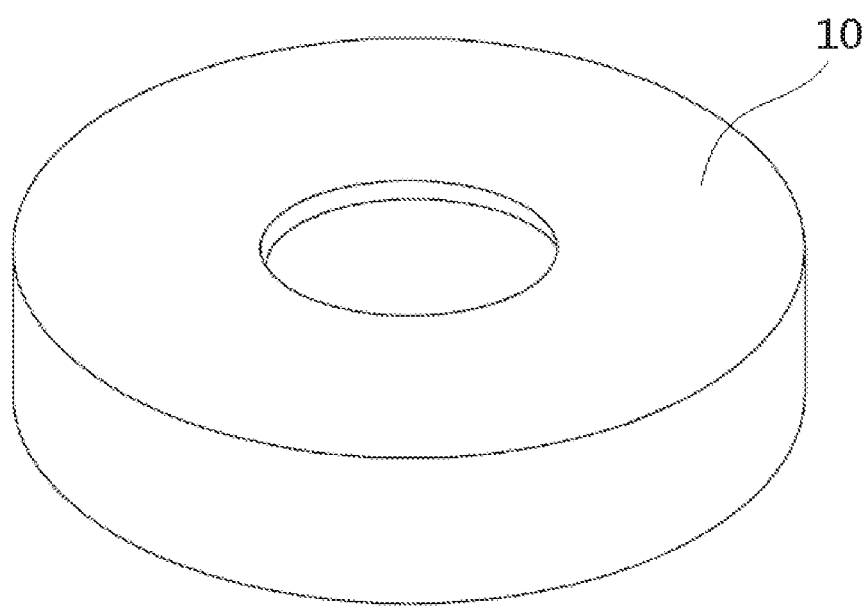
FIG. 2 is a perspective view of an annular component.

A concentricity detection system according to an embodiment, shown in FIG. 1, is adapted to detect a concentricity of an annular component 10 shown in FIG. 2. The concentricity detection system comprises a vision detection device 100, a support base 200, a transparent plate 210, and a backlight source 300. The support base 200 is formed with a recess 201 on a top surface thereof. The transparent plate 210 is received and positioned in the recess 201 of the support base 200. The vision detection device 100 is located above the support base 200 and faces the transparent plate 210. The backlight source 300 is located below the support base 200 and faces the transparent plate 210. In an embodiment, the visual detection device 100 is a two-dimensional or three-dimensional camera.

The annular component 10, shown in FIGS. 1 and 2, is placed in the recess 201 of the support base 200 and supported on a top surface of the transparent plate 210. The vision detection device 100 is configured to detect a concentricity of the annular component 10 supported on the transparent plate 210. A through hole 202 is formed in a bottom portion of the recess 201 of the support base 200, and a light from the backlight source 300 passes through the support base 200 via the through hole 202 and the transparent plate 210 so as to provide backlighting for the annular component 10.

In the embodiment shown in FIG. 1, both the recess 201 and the through hole 202 are circular. The through hole 202 has a diameter larger than an outer diameter of the annular component 10, and the recess 201 has a diameter larger than that of the through hole 202.

As shown in FIG. 1, the concentricity detection system comprises a housing 400 within which the vision detection device 100, the support base 200, and the backlight source 300 are accommodated. The concentricity detection system comprises a mounting bracket 500 fixed to an inner wall of the housing 400. The vision detection device 100 and the support base 200 are fixed onto the mounting bracket 500. The backlight source 300 is mounted on a bottom wall of the housing 400.

As shown in FIG. 1, the housing 400 is formed with an opening 401 through which the annular component 10 is placed into or removed from the housing 400.

The annular component 10, as shown in FIG. 2, is a tube slice cut from a tube so that a concentricity of the tube is determined by detecting a concentricity of the tube slice.

As shown in FIG. 1, the concentricity detection system comprises a computer 600 communicating with the vision detection device 100 and comprising a vision data processing system. The vision data processing system is adapted to calculate the concentricity of the annular component 10 according to data detected by the vision detection device 100. The concentricity detection system may automatically complete the concentricity detection of the annular component 10, thus improving the detection efficiency and accuracy.

As shown in FIG. 1, the concentricity detection system comprises a display 700 communicating with the computer 600 to display the data detected by the visual detection device 100 and a calculation result of the visual data processing system.

As shown in FIG. 1, the concentricity detection system comprises a keyboard 800 and a mouse 900 communicating with the computer 600 to operate the visual data processing system of the computer 600.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the disclosure have been described hereinbefore in detail with reference to the attached drawings, it should be appreciated that the disclosed embodiments in the attached drawings are intended to illustrate the embodiments of the disclosure by way of example, and should not be construed as limitation to the disclosure.

Although several exemplary embodiments have been shown and described, it would be appreciated by those skilled in the art that various changes or modifications may be made to these embodiments without departing from the principles and spirit of the disclosure, the scope of which is defined by the claims and their equivalents.

What is claimed is:

1. A concentricity detection system adapted to detect a concentricity of an annular component, comprising:
    a support base having a recess on a top surface of the support base;
    a transparent plate received and positioned in the recess, the annular component is disposed in the recess of the support base and supported on a top surface of the transparent plate;
    a vision detection device located above the support base and facing the transparent plate, the vision detection device is configured to detect the concentricity of the annular component supported on the transparent plate; and
    a backlight source located below the support base and facing the transparent plate, a through hole is formed in a bottom portion of the recess and a light from the backlight source passes through the support base via the through hole and the transparent plate to provide backlighting for the annular component.

2. The concentricity detection system of claim 1, further comprising a housing within which the vision detection device, the support base, and the backlight source are accommodated.

3. The concentricity detection system of claim 2, further comprising a mounting bracket fixed to an inner wall of the housing.

4. The concentricity detection system of claim 3, wherein the vision detection device and the support base are attached to and supported by the mounting bracket within the housing.

5. The concentricity detection system of claim 4, wherein the backlight source is mounted on a bottom wall of the housing.

6. The concentricity detection system of claim 2, wherein the housing has an opening through which the annular component is placed into or removed from the housing.

7. The concentricity detection system of claim 1, wherein the annular component comprises a segment of a tube and a concentricity of the tube is determined by detecting a concentricity of the segment.

8. The concentricity detection system of claim 7, wherein both the recess and the through hole are circular.

9. The concentricity detection system of claim 8, wherein the through hole has a diameter larger than an outer diameter of the annular component, and the recess has a diameter larger than that of the through hole.

10. The concentricity detection system of claim 1, wherein the vision detection device is a two-dimensional camera or a three-dimensional camera.

11. The concentricity detection system of claim 1, further comprising a computer communicating with the vision detection device and having a vision data processing system adapted to calculate the concentricity of the annular component according to data detected by the vision detection device.

12. The concentricity detection system of claim 11, further comprising a display communicating with the computer to display the data detected by the vision detection device and a calculation result of the vision data processing system.

13. The concentricity detection system of claim 12, further comprising a keyboard and a mouse communicating with the computer to operate the vision data processing system.

14. The concentricity detection system of claim 1, wherein the support base, the transparent plate, the vision detection system and the backlight source are each fixedly mounted with respect to one another such that the annular component is not moved relative thereto during a detection process performed by the vision detection device.

15. A concentricity detection system adapted to detect a concentricity of an annular component, comprising:
    a support base having a circular recess on a top surface of the support base;
    a transparent plate received and positioned in the recess, the annular component is disposed in the recess of the support base and supported on a top surface of the transparent plate;
    a vision detection device located above the support base and facing the transparent plate, the vision detection device is configured to detect the concentricity of the annular component supported on the transparent plate; and
    a backlight source located below the support base and facing the transparent plate, a circular through hole is formed in a bottom portion of the recess and a light from the backlight source passes through the support base via the through hole and the transparent plate to provide backlighting for the annular component, wherein the through hole has a diameter larger than an outer diameter of the annular component, and the recess has a diameter larger than that of the through hole.

* * * * *